United States Patent
Yang et al.

(10) Patent No.: US 10,858,504 B2
(45) Date of Patent: *Dec. 8, 2020

(54) POLYETHYLENE COMPOSITIONS COMPRISING CYCLIC-OLEFIN COPOLYMERS

(71) Applicant: ExxonMobil Chemical Patents Inc., Baytown, TX (US)

(72) Inventors: Yong Yang, Kingwood, TX (US); Alexander I. Norman, Houston, TX (US); Andy H. Tsou, Houston, TX (US); Kimari T. M. Slaughter, Baytown, TX (US); Bethany M. Welke, Seabrook, TX (US); Dinara R. Sunagatullina, Wheeling, IL (US)

(73) Assignee: ExxonMobil Chemical Patents Inc., Baytown, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/965,560

(22) Filed: Apr. 27, 2018

(65) Prior Publication Data

US 2019/0010314 A1 Jan. 10, 2019

Related U.S. Application Data

(60) Provisional application No. 62/529,096, filed on Jul. 6, 2017.

(51) Int. Cl.
*C08L 23/06* (2006.01)
*C08L 23/08* (2006.01)

(52) U.S. Cl.
CPC ........... *C08L 23/06* (2013.01); *C08L 23/0815* (2013.01); *C08L 2205/06* (2013.01); *C08L 2207/02* (2013.01); *C08L 2207/066* (2013.01); *C08L 2207/07* (2013.01)

(58) Field of Classification Search
CPC ...... C08L 23/0815; C08L 23/06; C08L 45/00; C08L 2207/02; C08L 2207/07; C08L 2207/068; C08L 2205/06
See application file for complete search history.

(56) References Cited

U.S. PATENT DOCUMENTS

| | | |
|---|---|---|
| 4,399,180 A | 8/1983 | Briggs et al. ........... B32B 27/32 |
| 5,635,573 A | 6/1997 | Harrington et al. |
| 6,111,019 A | 8/2000 | Arjunan et al. |
| 6,870,010 B1 † | 3/2005 | Lue |
| 6,872,462 B2 | 3/2005 | Roberts et al. |
| 7,041,765 B2 † | 5/2006 | Tau |
| 7,052,750 B2 | 5/2006 | Niepelt ................. C08J 5/18 |
| 7,179,521 B2 | 2/2007 | Arthurs et al. |
| 7,727,620 B2 | 6/2010 | Yamada et al. |
| 8,663,810 B2 | 3/2014 | Ambroise et al. ........ B29D 7/01 |
| 10,189,621 B2 | 1/2019 | Dayrit et al. ......... B65D 75/002 |
| 10,239,294 B2 | 3/2019 | Mitchell et al. ........ B32B 27/32 |
| 2002/0160135 A1* | 10/2002 | Christopherson et al. ...................B32B 27/32 428/35.7 |
| 2005/0214557 A1 | 9/2005 | Arthurs et al. ............... 428/516 |
| 2006/0057410 A1 | 3/2006 | Saavedra et al. ......... B32B 7/02 |
| 2006/0159878 A1 | 7/2006 | Wakai et al. |
| 2007/0098933 A1 | 5/2007 | Opuszko et al. |
| 2007/0110853 A1 | 5/2007 | Bekele .......................... 426/106 |
| 2008/0292821 A1 | 11/2008 | Dayrit et al. ................. 428/34.9 |
| 2008/0311370 A1 | 12/2008 | Tatarka |
| 2009/0068486 A1 | 3/2009 | Blackwell et al. ........... 428/516 |
| 2011/0015346 A1† | 1/2011 | Hermel-Davidock |
| 2011/0212338 A1 | 9/2011 | Ambroise ............... C08L 23/14 |
| 2011/0256373 A1 | 10/2011 | Tatarka et al. |
| 2013/0095338 A1 | 4/2013 | Lu ........................... B32B 27/08 |
| 2014/0134430 A1 | 5/2014 | Mitchell et al. |
| 2014/0353197 A1 | 12/2014 | Hu et al. |
| 2015/0010740 A1 | 1/2015 | Chen et al. ............. B32B 27/08 |
| 2015/0010741 A1 | 1/2015 | Pham et al. |
| 2015/0112026 A1* | 4/2015 | Schwitzer ............. A61L 29/085 525/240 |
| 2015/0273803 A1 | 10/2015 | Maruichi et al. ....... B32B 27/08 |
| 2016/0136884 A1 | 5/2016 | Kneale |
| 2016/0326353 A1 | 11/2016 | Prades et al. |
| 2016/0368251 A1 | 12/2016 | Banno et al. ......... B32B 27/325 |

(Continued)

FOREIGN PATENT DOCUMENTS

| | | |
|---|---|---|
| EP | 2799230 | 7/2013 |
| GB | 2397065 | 7/2004 |

(Continued)

OTHER PUBLICATIONS

O'Neil et al "Characterization of activated cyclic olefin copolymer: effects of ethylene/norbornene content on the physiochemical properties";Analyst, 2016, 141, 6521-6532 (Year: 2016).*

Randy Jester, "Heat Seal Characteristics of Cyclic-olefin Copolymer/ Polyethylene Blends," TOPAS 2002 Place Conference, Boston, Massachusetts (2002).

Paul D. Tatarka, "Polyolefin Film Enhancement Using Cyclic-olefin Copolymers for Retort Applications," SPE Polyolefin & Flexpack Conference, Feb. 25, 2008.

Paul D. Tatarka, "Thermoforming Enhancement With Cyclic-olefin Copolymers," SPE International Polyolefins Conference, Houston, Texas (Feb. 22, 2009).

(Continued)

*Primary Examiner* — Nathan M Nutter
(74) *Attorney, Agent, or Firm* — Catherine L. Bell (57) ABSTRACT

A composite comprising a polyethylene and within a range from 1 wt % to 25 wt % of at least one cyclic-olefin copolymer by weight of the composition, where the polyethylene may have a density of at least 0.90 g/cm$^3$, and where the cyclic-olefin copolymer has a glass transition temperature (Tg) of at least 30° C. Disclosed also is the feature of orienting the composite to form an oriented article, wherein the article comprises rods having an average length of at least 1 μm, and at least 5 nm in average diameter.

31 Claims, 4 Drawing Sheets

(56) References Cited

U.S. PATENT DOCUMENTS

| 2017/0233516 | A1 | 8/2017 | Yang et al. |
| 2017/0283116 | A1 | 10/2017 | Mitchell et al. ... B65D 23/0878 |
| 2018/0333938 | A1 | 11/2018 | Cheng et al. ............ B32B 27/08 |
| 2019/0211192 | A1* | 7/2019 | Hall et al. ................ C08L 23/06 |

FOREIGN PATENT DOCUMENTS

| JP | 2004-025458 | 1/2004 | ............ B32B 27/32 |
| JP | 2005-199514 | 7/2005 | ............ B32B 27/32 |
| JP | 2005-254458 | 9/2005 | ............ B32B 27/00 |
| JP | 2011-104816 | 6/2011 | ............ B32B 27/32 |
| JP | 5462697 | 4/2014 | ............ B32B 27/00 |
| JP | 2015-199797 | 11/2015 | ............ B32B 27/32 |
| WO | 2001/018112 | 3/2001 | |
| WO | 2004/098882 | 11/2004 | |
| WO | 2014/141820 A | 9/2014 | |
| WO | 2015-004311 | 1/2015 | ............ B32B 27/32 |
| WO | 2015-004312 | 1/2015 | ............ B32B 27/32 |
| WO | 2015-004313 | 1/2015 | ............ B32B 27/32 |

OTHER PUBLICATIONS

Norman Aubee & Timothy Kneale, "Blending of Cyclic Olefins in Single Site LLDPE (sLLDPE) for Improved Bubble Stability and Output Rates on Blow Film Extrusion Process," in SPE International Polyolefins Conference, Houston, Texas (Feb. 22, 2009).
Randy Jester, "COC Enhanced Polyolefin Films for Shrink Sleeves and Labels," in AWA International Sleeve & Label Conference, Chicago, Illinois (2010).
Horiuchi, S., et al., "Study of the adhesion and interface of the low-temperature bonding of vacuum ultraviolet-irradiated cycloolefin polymer using electron microscopy", Polymer Journal, vol. 48, pp. 473-479, 2016.
Taglialatela Scafati, S., et al., "Modulation of barrier properties of monolayer films from blends of polyethylene with ethylene-co-norbornene", Journal of Applied Polymer Science, vol. 121, pp. 3020-3027, 2011.
Dorigato, A., et al., "Linear low density polyethylene/cycloolefin copolymer blends", eXPRESS Polymer Letters, vol. 5, No. 1, pp. 23-37, 2011.
Seydewitz, V., et al., "Morphology and micromechanical behaviour of ethylene cycloolefin copolymers (COC)", Polymer, vol. 46, No. 15, pp. 5608-5614, 2005.
Kolarik, J., et al., "High-density polyethylene/cycloolefin copolymer blends. Part 1: Phase structure, dynamic mechanical, tensile, and impact properties", Polymer Engineering and Science, vol. 45, No. 6. pp. 817-826, 2005.
Slouf, M., et al., "Phase morphology of PP/COC blends", Journal of Applied Polymer Science, vol. 91, No. 1, pp. 253-259, 2004.
Pimbert, S., "Evaluation of the fractionated crystallization of isotactic polypropylene and high density polyethylenes in their blends with cycloolefin copolymers", Macromolecular Symposia, vol. 203, pp. 277-283, 2003.
Constant, David R. (2003) "Cyclic-Olefinic Copolymers as Non-Migrating Polymeric Slip Additives in LDPE Cast Films," https://www.pffc-online.com/flexpack/96-paper-cyclicolefinic-copolymers-nonmigrating , 3 pgs.

Jester, Randy (2005) "TOPAS Cyclic Olefin Copolymers in Food Packaging—High Aroma Barrier Combined with Low Extractables," *PLACE Conference*, Las Vegas, NV, Sep. 27, 2005, 14 pgs.
O'Neil, Colleen E. et al. (2016) "Characterization of Activated Cyclic Olefin Copolymer: Effects of Ethylene/Norbornene Content on the Physiochemical Properties," *Royal Soc. Of Chem., Analyst*, v.141, pp. 6521-6532.
Shit, Subhas C. (2008) "Studies on Effect of Blending of Material of High Tg on Polyethylene," *Popular Plastics & Packaging*, v.53(9), pp. 37-39.
Tatarka, Paul D. (2007) "Improved Properties and Cost Efficiencies of Cyclic Olefin Copolymer Enchanced Forming Films," $65^{th}$ Ann. Tech. Conf., *Soc. of Plastics Eng.*, pp. 1145-1149.
Aubee, Norman et al. (2009) "Blending of Cyclic Olefins in sLLDPE for Improved Bubble Stability and Output Rates on Blown Film Extrusion Processes," *Int 'l Polyolefins Conf., Houston, TX*, 6 pages.
Dyer, David et al. (2011) "Sequential Shrink Photolithography for Plastic Microlens Arrays," *Applied Phy. Letters*, v.99(3), pp. 034102/1-034102/3.
Ebrahimi, M. et al. (2017) "Morphology of PP/COC Composites: Effects of Shear Rate and Oranoclay Partitioning," *Univ. of Br. Col., Vancouver, CA*, 24 pages.
Jester, Randy D. (2007) "Cyclic Olefin Copolymer—A High Performance Modifier for Conventional Polyolefins," *SPE Int'l Polyolefins Conf.*, 4 pgs.
Abstract—Shit, Subhas C. (2008) "Processing of Tailored Quality Film from COC Material," *Popular Plastics & Packaging*, v.53(10), pp. 25-28. https://chemport.cas.org/cgi-bin/sdcgi?APP=cp_stnexpress &SERVICE=STN&CLI=stnexpress&SID=354608-0996188254-104 &FID=REDISPLAY&LANG=english&R=326773.
TOPAS Advanced Polymers Product Brochure, "Packing Brochure," https://topas.com/tech-center/brochures (accessed Feb. 27, 2018).
Thrombley, Kurt (2001) "Cyclic Olefin Copolymer: an Alternative Plastic Film for Pharmaceutical Blister Packages," *Rochester Institute of Technology*, Thesis, 86 pgs.
Lamnawar, K., et al. "Rheological, Morphological, and Heat Seal Properties of Linear Low Density Polyethylene and Cyclo Olefine Copolymer (LLDPE/COC) Blends." Journal of Applied Polymer Science, vol. 116(4), pp. 2015-2022, published online on Jan. 7, 2010.†
Ostafinska, A., et al. "Strong Synergistic Improvement of Mechanical Properties in HDPE/COC Blends with Fibrillar Morphology." Polymer Engineering & Science, vol. 58(11), pp. 1955-1964, published Nov. 2018.†
Shit, S.C. "Studies on Effect of Blending of Material of High Tg on Polyethylene." Popular Plastics & Packaging, vol. 53(9), pp. 37-39, published Sep. 2008.†
Kolarik, J., et al. "High-Density Polyethylene/Cycloolefin Copolymer Blends. Part 1: Phase Structure, Dynamic Mechanical, Tensile, and Impact Properties." Polymer Engineering and Science, vol. 45(6), pp. 817-826, published in 2006.†

\* cited by examiner
† cited by third party

POLYETHYLENE COMPOSITIONS COMPRISING CYCLIC-OLEFIN COPOLYMERS

CROSS REFERENCE TO RELATED APPLICATIONS

This application claims the benefit of priority from U.S. Provisional Application No. 62/529,096, filed Jul. 6, 2017, which is incorporated herein by reference.

FIELD OF THE INVENTION

The present disclosure relates to blends of polyethylenes and cyclic-olefin copolymers that form composites having improved stiffness and melt strength relative to polyethylene alone.

BACKGROUND

Cyclic-olefin copolymers (COCs) can be broadly defined as polyolefins incorporating cyclic comonomers, an example of which are ethylene-norbornene copolymers. Many commercial COC's are amorphous materials with high glass transition temperatures (above 50° C.), with 40 mol % and above norbornene content. Typically, COC's have high use temperatures, good optical properties, high stiffness and strength, are excellent moisture barriers, and have good polar chemical resistance. However, traditional COC's suffer from poor toughness, insufficient oxygen barrier properties, poor oil resistance, and processing difficulties of the neat resins. The poor miscibility of amorphous COC's with most semi-crystalline polyolefins also limits their applications and value proposition realization in blends and composites.

It is desirable to form blends or composites of COC's with other polymers and fillers. A "composite" is a material made from two or more different materials having significantly different physical and/or chemical properties that, when combined, produce a material with characteristics different from the individual components.

To improve the properties of COC's, such as their toughness, fillers and reinforcing agents are often used. The typical reinforcing agents for organic polymers are inorganic materials such as glass and carbon fibers. Due to the dramatic differences in organic and inorganic materials, sizing agents or compatibilizers are typically needed in order to have the inorganic fibers chemically or physically well attached to the organic polymer matrices for the improvement of overall composite properties. What would be ideal is a way to reinforce polyolefins such as polyethylene without the need for inorganic fillers, fibers, and/or other inorganic additives.

Publications of interest include U.S. Pat. Nos. 7,727,620; 7,179,521; 6,872,462; U.S. Patent Publication Nos. 2015/0010741; 2014/0353197; 2011/0256373; 2007/00098933; 2006/0159878; and PCT Publication No. WO 2014/141820. Other publications of interest include:

Randy Jester, "Heat Seal Characteristics of Cyclic-olefin Copolymer/Polyethylene Blends," in TAPPI 2002 PLACE CONFERENCE, Boston, Mass. (2002);

David R. Constant, "Cyclic Olefinic Copolymers as Non-Migrating Polymeric Slip Additives in LDPE Cast Films," in ANTEC 2002 CONFERENCE, San Francisco, Calif. (2002);

Ronald R. Lamonte, "Stiffer, Thinner, Packaging Films with Improved Sealing Using Cyclic-olefin Copolymers," in FLEXPAC CONFERENCE, Amsterdam, Holland (November 2003);

Randy Jester, "High Aroma Barrier Combined with Low Extractables," in 2005 PLACE CONFERENCE, Las Vegas, Nev. (Sep. 27, 2005);

Randy Jester, "Cyclic-Olefin Copolymer—A High Performance Modifier for Conventional Polyolefins," in SPA POLYOLEFINS CONFERENCE, Houston, Tex. (Feb. 25, 2007);

Paul D. Tatarka, "Improved Properties and Cost Efficiencies of Cyclic-olefin Copolymer Enhanced Forming Films," SPE ANNUAL TECHNICAL CONFERENCE (May 7, 2007);

Paul D. Tatarka, "Polyolefin Film Enhancement Using Cyclic-olefin Copolymers for Retort Applications," in SPE POLYOLEFIN & FLEXPACK CONFERENCE, February 25 (2008);

Paul D. Tatarka, "Thermoforming Enhancement With Cyclic-olefin Copolymers," in SPE INTERNATIONAL POLYOLEFINS CONFERENCE, Houston, Tex. (Feb. 22, 2009);

Norman Aubee & Timothy Kneale, "Blending of Cyclic Olefins in Single Site LLDPE (sLLDPE) for Improved Bubble Stability and Output Rates on Blow Film Extrusion Process," in SPE INTERNATIONAL POLYOLEFINS CONFERENCE, Houston, Tex. (Feb. 22, 2009); and Randy Jester, "COC Enhanced Polyolefin Films for Shrink Sleeves and Labels," in AWA INTERNATIONAL SLEEVE & LABEL CONFERENCE, Chicago, Ill. (2010).

SUMMARY

Disclosed herein is a composite comprising (or consisting of, or consisting essentially of) a polyethylene and within a range from 1, or 3 wt % to 7, or 8, or 10, or 15, or 20, or 25 wt % of at least one cyclic-olefin copolymer by weight of the composition, wherein the cyclic-olefin copolymer has a glass transition temperature (Tg) of at least 30, or 40, or 50, or 60, or 65, or 70° C.

Also disclosed is a method for forming a composite comprising (or consisting of, or consisting essentially of) combining a polyethylene and within a range from 1, or 3 wt % to 7, or 8, or 10, or 15, or 20, or 25 wt % of at least one cyclic-olefin copolymer by weight of the composition, wherein the cyclic-olefin copolymer has a Tg of at least 30, or 40, or 50, or 60, or 65, or 70° C.; and orienting the composite to form an article, wherein the article comprises rods having an average length of at least 1, or 2, or 4, or 5 µm, and at least 5, or 10, or 20, or 30 nm in average diameter; or an average length within a range from 1, or 2, or 4, or 5 µm, to 8, or 10, or 20, or 50 µm, and average diameter within a range from 5, or 10, or 20, or 30 nm to 60, or 80, or 100, or 120 nm.

DETAILED DESCRIPTION

The inventors have found that COC's can be used as a way to reinforce polyolefins such as polyethylene without the need for inorganic fillers, fibers, and/or other inorganic additives. Thus, in this disclosure, the immiscibility and compatibility between COC and polyethylene (PE), as evidenced by Atomic Force Microscopy (AFM) and other tools as described herein, are taken advantage of to form improved composition that can be oriented by standard means such as by forming a film, or thermoforming an article. In this manner in-situ generated COC "rods" are formed during normal fabrication processes with strong orientation flow components. The COC rods are well situated between the oriented fibrillar PE lamella, with a smooth interface and dangling COC chains diffused inside the amorphous domains of PE, creating a well intertwined all organic polymer nanocomposite. An example of the benefits is the drastic melt strength enhancement, as described herein. The melt strength enhancement can potentially help LLDPE's replace LDPE or polypropylene (PP) for such uses as extrusion coating. The COC-PE composite is expected to give rise to improved and balanced mechanical properties, synergizing the excellent stiffness from COC and toughness from LLDPE.

As used herein, a "cyclic-olefin copolymer" (COC) is a copolymer comprising 50 wt % or more cyclic olefin or its derived units, the remainder being ethylene and optional α-olefins. The cyclic olefin derived units are selected from C5 to C8, or C12, or C16, or C20 olefins comprising at least one C5 to C8 cyclic structure, such as, for example, bicyclo compounds such as bicyclo-(2,3,1)-heptene-2. Preferably, the cyclic olefin derived unit is selected from C5, or C6 to C8, or C10, or C12, or C20 cyclic-olefin derived units, and more preferably bicyclic olefin derived units which are cyclic olefins containing a bridging hydrocarbon moiety that forms two rings in the overall structure such as in bicyclo-(2,3,1)-heptene-2 (norbornene). Most preferably, the cyclic olefin derived units are selected from norbornene, tetracyclododecene, and substituted versions thereof. The term "cyclic-olefin copolymer" includes a blend of two or more different cyclic-olefin copolymers.

The cyclic-olefin copolymers can be made by any suitable polymerization means. In any embodiment, the cyclic olefin monomer that is combined with ethylene monomers in the polymerization process is selected from C5 to C8, or C12, or C16, or C20 olefins comprising at least one C5 to C8 cyclic structure, such as, for example, bicyclo compounds such as bicyclo-(2,3,1)-heptene-2. Preferably, the cyclic olefin is selected from C5, or C6 to C8, or C10, or C12, or C20 cyclic olefins, and more preferably bicyclic olefins which are cyclic olefins containing a bridging hydrocarbon moiety that forms two rings in the overall structure such as in bicyclo-(2,3,1)-heptene-2 (norbornene). Most preferably, the cyclic olefins used to make the COC's are selected from norbornene, tetracyclododecene, and substituted versions thereof. In order to effect the polymerization process upon combining, as well as combining at a desirable temperature, the components are preferably combined at a pressure of at least 0.8, or 1, or 2, or 3 MPa; or within a range from 0.8, or 1, or 2, or 3 MPa to 4, or 6, or 8, or 10 MPa. This pressure can come from the addition of the ethylene and/or other gases in the polymerization reactor, and is of course influenced by the temperature of the reactor. The level of ethylene and cyclic olefin is adjusted to obtain the desired catalytic activity as well as desired level of cyclic olefin comonomer incorporation into the polyethylenes described herein. In any embodiment, the combining of the monomers with catalyst can take place at a reaction temperature, the average temperature within the vessel or reactor used to combine the components to effect polymerization, within a range from 80, or 85, or 90, or 100° C. to 120, or 130, or 140, or 150° C.

Thus, in any embodiment is a composite comprising (or consisting of, or consisting essentially of) a polyethylene and within a range from 1, or 3 wt % to 7, or 8, or 10, or 15, or 20, or 25 wt % of at least one cyclic-olefin copolymer by weight of the composition, wherein the cyclic-olefin copolymer has a Tg value of at least 30, or 40, or 50, or 60, or 65, or 70° C. In any embodiment, the cyclic-olefin copolymer comprises at least 50, or 60, or 65, or 70, or 75 wt % cyclic olefin derived units, by weight of the copolymer. In any embodiment, the cyclic-olefin copolymer has a Tg value within a range from 30, or 40, or 50, or 60, or 65, or 70, or 75, or 80, or 90, or 100° C. to 145, or 155, or 160, or 170, or 180° C. Finally, the composites described herein may have a heat of fusion ($\Delta H$) of less than 120, or 115 J/g, or within a range from 80, or 85, or 90, or 95, or 100, or 105 J/g to 115, or 120 J/g.

The cyclic-olefin copolymer can also be described by a number of other properties. In any embodiment, the cyclic-olefin copolymer has a melt index (MI (190° C./2.16 kg)) within a range from 0.05, or 0.10 g/10 min to 1, or 2, or 3, or 4 g/10 min. In any embodiment, the cyclic-olefin copolymer useful in the composites described herein have a density within a range from 0.96, or 0.98 g/cm$^3$ to 1, or 1.05, or 1.1 g/cm$^3$. Finally, in any embodiment the cyclic-olefin copolymer has a branching index (g'vis) of greater than 0.95, or 0.96, or 0.97, or within a range from 0.95, or 0.96, or 0.97 to 1, or 1.1.

As used herein, "polyethylene" refers to a polymer comprising at least 60, or 70, or 80, or 90 wt %, by weight of the polymer, of ethylene-derived units, the remainder comprising units derived from C3 to C12 α-olefins, especially 1-butene, 1-hexene, and/or 1-octene. Useful polyethylenes may be made using a metal catalyst such as a chromium catalyst or metallocene-type catalyst as is known in the art, or can be made by a high pressure free-radical process. Typically, the later method produces low density polyethylenes (LDPE) having a g'vis within a range from 0.5 to 0.7, while the use of metal catalysts produces linear low density polyethylene (LLDPE) having a g'vis of 0.8, or 0.85 to 0.95 or 1. High density polyethylenes (HDPE) may also be useful in the invention described herein. In any embodiment, the polyethylene has a density within a range from 0.90, or 0.91, or 0.915, or 0.92 to 0.925, or 0.93 or 0.935, or 0.94 g/cm$^3$. In any embodiment, a blend of LLDPE's, LDPE's, and/or HDPE's, individually or together, may be used as the "polyethylene." For instance, the "polyethylene" may be a blend of a HDPE and LDPE, or two different LLDPE's, etc. In any embodiment, the polyethylene is a LLDPE, or LDPE, or a blend of the two.

In any embodiment, the MI (190° C./21.6 kg) of the polyethylene is greater than 10, or 12, or 14, or 15 g/10 min, and is preferably within a range from 10, or 12, or 14, or 15, or 20, or 28 g/10 min to 34, or 36, or 38, or 40, or 44, or 48, or 50 g/10 min.

The properties of the composite can vary depending on the nature of both the cyclic-olefin copolymer and the polyethylene. For instance, in any embodiment the polyethylene has a branching index (g'vis) of less than 0.8 (highly branched), and the composite has a melt strength ($\sigma z$) within a range from 300 kPa to 500, or 600 kPa. In any embodiment, the polyethylene has a branching index (g'vis) of greater than 0.95 (highly linear), and the composite has a melt strength ($\sigma z$) within a range from 100 kPa to 500 kPa, or 900, or 1000 kPa. Also, in any embodiment, the polyethylene has a branching index (g'vis) within a range from 0.95 to 0.8 (moderately branched), and the composite has a melt strength ($\sigma z$) of greater than 800, or 1000, or 1200, or 1400 kPa.

The composite comprises an intimate blend of the cyclic-olefin copolymer and polyethylene, such as a melt blend of the two components having been co-extruded through a single or double screw extruder, or a Brabender-type blender. This blend may have rods as described below, but preferably, the oriented article comprises a larger number of such rods. In any case, the composites have in any embodiment a crystallization temperature (Tc) of at least 100, or 102° C., or within a range from 100, or 102° C. to 106, or 110° C. Also, in any embodiment the composites have a melt strength ($\sigma z$) of greater than 500, or 600, or 800, or 1000, or 1200, or 1400 kPa, or within a range from 500, or 600, or 800, or 1000, or 1200, or 1400 kPa to 2000, or 2400, or 2600, or 3000, or 3400, or 3600, or 4000, or 4400, or 4600, or 5000 kPa. Finally, in any embodiment the composites have a pull-off force (F) of at least 8, or 10, or 12, or 14 cN, or within a range from 8, or 10, or 12, or 14 cN to 20, or 30, or 40 cN.

Given the nature of the composite and its final properties, especially the properties of the oriented articles made therefrom, the use of reinforcing additives is often not necessary. For instance, in any embodiment inorganic fillers and/or fibers are absent. Such fillers would include talc, calcium carbonate, mica, glass fibers, and other inorganic compounds as is known in the art. Also, in any embodiment polymeric compatibilizers and/or sizing agents are absent.

As used herein, polymeric "compatibilizers" are typically block or graft copolymers, preferably low molecular weight (e.g., Mw less than 50,000 g/mole), that improve the immiscibility of two or more polymers in a blend by breaking up large domains of polymer into smaller domains. Typically, the different blocks of the copolymers resemble the chemical structures of the individual components of the blends. The respective portions of the copolymer are able to interact with the phases of the blend to make the phase morphology more stable. This helps immiscible domains within a continuous phase of a blend break up into smaller particles in the melt phase. An example is an ethylene-propylene block copolymer used to compatibilize blends of polyethylene and polypropylene. Small molecule compatibilizers can also be called "coupling agents," which can react with the components of blends to form copolymers or block copolymers in-situ, which in turn function as polymeric compatibilizers.

Finally, compounds known as "sizing agents" are also absent in any embodiment. As used herein, "sizing agents" are chemicals used to treat inorganic fillers, typically by chemically reacting with or otherwise bonding to moieties on the solid surface to improve its compatibility with the organic polymer matrix. Sizing agents are amphiphilic molecules with the hydrophilic end physically or chemically attached to the inorganic filler and the hydrophobic end forming a "film" compatible with the organic polymer matrix. Examples include silanes and imides, compounds that could react with a surface hydroxyl group of a solid support.

The composite described herein, in any of its embodiments, can be formed into an oriented article. The process of "orienting" can comprise any number of processes that impart a directional sheer stress upon a melt of the composite such as the process of melt blending in a single or twin screw extruder, melt blending in a Brabender-type of apparatus, or in forming a film from the composite or compositions comprising the composite, thermoforming, rotomolding, blow molding, injection molding, extrusion coating, and/or foaming of the composite or compositions comprising the composite. Most preferably, the orienting process comprises forming a film from the composite or compositions comprising the composite, thermoforming, blow molding, injection molding, extrusion coating, and/or foaming the composite or compositions comprising the composite. Thus, in any embodiment the composite, but most preferably the oriented article therefrom, comprises rods having an average length of at least 1, or 2, or 4, or 5 µm, and at least 5, or 10, or 20, or 30 nm in average diameter; or an average length within a range from 1, or 2, or 4, or 5 µm, to 8, or 10, or 20, or 50 µm, and average diameter within a range from 5, or 10, or 20, or 30 nm to 60, or 80, or 100, or 120 nm.

Thus, also disclosed is a method for forming the composite comprising (or consisting of, or consisting essentially of) combining a polyethylene and within a range from 1, or 3 wt % to 7, or 8, or 10, or 15, or 20, or 25 wt % of at least one cyclic-olefin copolymer by weight of the composition, wherein the cyclic-olefin copolymer has a Tg value of at least 30, or 40, or 50, or 60, or 65, or 70° C.; and orienting the composite to form an article, wherein the article comprises rods having an average length of at least 1, or 2, or 4, or 5 µm, and at least 5, or 10, or 20, or 30 nm in average diameter; or an average length within a range from 1, or 2, or 4, or 5 µm to 8, or 10, or 20, or 50 µm, and average diameter within a range from 10, or 20, or 30, or 40 nm to 60, or 80, or 100, or 120 nm. The oriented article therefrom is then formed by an orienting step such as film formation, thermoforming, etc.

The composites thus produced can be formed into useful articles through processes that orient the material to facilitate formation of the rods. For instance, in any embodiment a foamed article can be formed from the composite or composite in a blend with another polymer and/or additive (e.g., filler, anti-oxidant, etc.). Foaming agents useful in forming foamed articles described herein may be normally gaseous, liquid or solid compounds or elements, or mixtures thereof. These foaming agents may be characterized as either physically-expanding or chemically decomposing. Of the physically expanding foaming agents, the term "normally gaseous" is intended to mean that the expanding medium employed is a gas at the temperatures and pressures encountered during the preparation of the foamable compound, and that this medium may be introduced either in the gaseous or liquid state as convenience would dictate. Such agents can be added to the composites by blending the dry polymer with the foaming agent followed by melt extrusion, or by blending the agents in the polymer melt during extrusion. The foaming agent, especially gaseous agent, may be blended with the polymer melt as it exits the melt extruder or mold that is used for forming the foamed articles.

Included among exemplary, normally gaseous and liquid foaming agents are the halogen derivatives of methane and ethane, such as methyl fluoride, methyl chloride, difluoromethane, methylene chloride, perfluoromethane, trichloromethane, difluoro-chloromethane, dichlorofluoromethane, dichlorodifluoromethane, trifluorochloromethane, trichloromonofluoromethane, ethyl fluoride, ethyl chloride, 2,2,2-trifluoro-1,1-dichloroethane, 1,1,1-trichloroethane, difluorotetrachloroethane, 1,1-dichloro-1-fluoroethane, 1,1-difluoro-1-chloroethane, dichloro-tetrafluoroethane, chlorotrifluoroethane, trichlorotrifluoroethane, 1-chloro-1,2,2,2-tetrafluoroethane, 1,1-difluoroethane, 1,1,1-trifluoroethane, 1,1,1,2-tetrafluoroethane, perfluoroethane, pentafluoroethane, 2,2-difluoropropane, 1,1,1-trifluoropropane, perfluoropropane, dichloropropane, difluoropropane, chloroheptafluoropropane, dichlorohexafluoropropane, perfluorobutane, perfluorocyclobutane, sulfur-hexafluoride, and mixtures thereof. Other normally gaseous and liquid foaming agents that may be employed are hydrocarbons and other organic compounds such as acetylene, ammonia, butadiene, butane, butene, isobutane, isobutylene, dimethylamine, propane, dimethylpropane, ethane, ethylamine, methane, monomethylamine, trimethylamine, pentane, cyclopentane, hexane, propane, propylene, alcohols, ethers, ketones, and the like. Inert gases and compounds, such as nitrogen, argon, neon or helium, can also be used as foaming agents.

Solid, chemically decomposable foaming agents, which decompose at elevated temperatures to form gasses, can be used to expand the composites. In general, the decomposable foaming agent will have a decomposition temperature (with the resulting liberation of gaseous material) from 130° C. to 200, or 250, or 300, or 350° C. Exemplary chemical foaming agents include azodicarbonamide, p,p'-oxybis(benzene) sulfonyl hydrazide, p-toluene sulfonyl hydrazide, p-toluene sulfonyl semicarbazide, 5-phenyltetrazole, ethyl-5-phenyltetrazole, dinitroso pentamethylenetetramine, and other azo, N-nitroso, carbonate and sulfonyl hydrazide compounds as well as various acid/bicarbonate compounds which decompose when heated. Representative volatile liquid foaming agents include isobutane, difluoroethane or blends of the two. For decomposable solid foaming agents, azodicarbonamide is preferred, while for inert gasses, carbon dioxide is preferred.

The art of producing foam structures is known, especially for styrenic compositions. The foamed articles of the present invention may take any physical configuration known in the art, such as sheet, plank, other regular or irregular extruded profile, and regular or irregular molded bun stock. Exemplary of other useful forms of foamed or foamable objects known in the art include expandable or foamable particles, moldable foam particles, or beads, and articles formed by expansion and/or consolidation and fusing of such particles. In any embodiment, the foamable article or composites may be cross-linked prior to expansion, such as for the process of free-radical initiated chemical cross-linking or ionizing radiation, or subsequent to expansion. Cross-linking subsequent to expansion may be effected if desired by exposure to chemical cross-linking agents or radiation or, when silane-grafted polymers are used, exposure to moisture optionally with a suitable silanolysis catalyst.

Illustrative, but non-limiting, of methods of combining the various ingredients of the foamable composites include melt-blending, diffusion-limited imbibition, liquid-mixing, and the like, optionally with prior pulverization or other particle-size reduction of any or all ingredients. Melt-blending may be accomplished in a batchwise or continuous process, and is preferably carried out with temperature control. Furthermore, many suitable devices for melt-blending are known to the art, including those with single and multiple Archimedean-screw conveying barrels, high-shear "Banbury" type mixers, and other internal mixers. The object of such blending or mixing, by means and conditions which are appropriate to the physical processing characteristics of the components, is to provide therein a uniform mixture. One or more components may be introduced in a step-wise fashion, either later during an existing mixing operation, during a subsequent mixing operation or, as would be the case with an extruder, at one or more downstream locations into the barrel.

Expandable or foamable composites will have a foaming agent incorporated therein, such as a decomposable or physically expandable chemical blowing agent, so as to effect the expansion in a mold upon exposure of the composition to the appropriate conditions of heat and, optionally, the sudden release of pressure. The composites find many uses as foamed articles including automotive components, insulation and other construction components, food containers, sports equipment, and other domestic and commercial uses.

The composites can also be thermoformed to make useful thermoformed articles. Thermoforming is a manufacturing process where the composite sheet is heated to a pliable forming temperature, formed to a specific shape in a mold, and trimmed to create a usable product. The sheet, or "film" when referring to thinner gauges and certain material types, is heated in an oven to a high-enough temperature that permits it to be stretched into or onto a mold and cooled to a finished shape. Its simplified version is vacuum forming. The composites described herein can desirably be formed into films or sheets suitable for thermoforming processes.

In any embodiment, a small tabletop or lab size machine can be used to heat small cut sections of composite sheet and stretch it over a mold using vacuum. This method is often used for sample and prototype parts. In complex and high-volume applications, very large production machines can be utilized to heat and form the composite sheet and trim the formed parts from the sheet in a continuous high-speed process, and can produce many thousands of finished parts per hour depending on the machine and mold size and the size of the parts being formed. The composites described herein are suitable for both types of thermoforming.

One desirable type of thermoforming is thin-gauge thermoforming. Thin-gauge thermoforming is primarily the manufacture of disposable cups, containers, lids, trays, blisters, clamshells, and other products for the food, medical, and general retail industries. Thick-gauge thermoforming includes parts as diverse as vehicle door and dash panels, refrigerator liners, utility vehicle beds, and plastic pallets. Heavy-gauge forming utilizes the same basic process as continuous thin-gauge sheet forming, typically draping the heated plastic sheet over a mold. Many heavy-gauge forming applications use vacuum only in the form process, although some use two halves of mating form tooling and include air pressure to help form.

In any embodiment, a sheet comprising (or consisting essentially of) the composite is fed from a roll or from an extruder into a set of indexing chains that incorporate pins, or spikes, that pierce the sheet and transport it through an oven for heating to forming temperature. The heated sheet then indexes into a form station where a mating mold and pressure-box close on the sheet, with vacuum then applied to remove trapped air and to pull the material into or onto the mold along with pressurized air to form the plastic to the detailed shape of the mold. Plug-assists are typically used in addition to vacuum in the case of taller, deeper-draw formed parts in order to provide the needed material distribution and thicknesses in the finished parts. In any case, after a short form cycle, a burst of reverse air pressure is actuated from the vacuum side of the mold as the form tooling opens, commonly referred to as air-eject, to break the vacuum and assist the formed parts off of, or out of, the mold. A stripper plate may also be utilized on the mold as it opens for ejection of more detailed parts or those with negative-draft, undercut areas. The composite sheet containing the formed parts then indexes into a trim station on the same machine, where a die cuts the parts from the remaining sheet web, or indexes into a separate trim press where the formed parts are trimmed. The sheet web remaining after the formed parts are trimmed is typically wound onto a take-up reel or fed into an inline granulator for recycling.

Generally, the inventive composites find use in making many thermoformed articles such as automotive components, construction components, electronic devices, medical equipment, sports equipment, food containers, appliances, and other domestic and commercial uses. Similarly, the composites can find use thermoformed articles made from injection molding, blow molding, and rotational molding processes.

The various descriptive elements and numerical ranges disclosed herein for the inventive COC/PE composites and methods of forming such can be combined with other descriptive elements and numerical ranges to describe the invention(s); further, for a given element, any upper numerical limit can be combined with any lower numerical limit described herein, including the examples in jurisdictions that allow such combinations. The features of the inventions are demonstrated in the following non-limiting examples.

EXAMPLES

Methodology.

Topas™ 5013 COC (Topas Advanced Polymers) (norbornene: 78 wt % or 51 mol %, density: 1.02 g/cm$^3$, MI less than 0.1 g/10 min at 190° C. and 2.16 kg load, Tg: 134° C.) ("COC1") was added into Exceed™ 1018 LLDPE (ExxonMobil Chemical Company) at 3, 5, 10% levels respectively. The mixtures were melt blended in an 18 mm twin-screw extruder and pelletized. The compounded blends were subjected to melt strength measurement using the Rheotester 1000 capillary rheometer in combination with the Rheotens 71.97 (Göttfert) as described below. In the testing, the samples were oriented by drawdown of the rolls. The draw-down force applied to the strand is considered as an orientation, triggering the formation of COC rods as evidenced in AFM measurements.

In the same manner, Topas™ 9506 ("COC2") (norbornene: 62 wt %, 33 mol %; density: 1.01 g/cm$^3$, MI of 1 g/10 min at 190° C. and 2.16 kg load, Tg: 65° C.) was blended with other LLDPE's and LD's. The materials are summarized in Table 1. These COC's were also blended with Enable™ 2010 (ExxonMobil Chemical Company) and a low density LD165BW (ExxonMobil Chemical Company). The melt strength values are summarized in Tables 2 and 3. Further characterizations were performed on the blends, and single LLDPE and LD samples, and summarized in Tables 4, 5, and 6.

The Exceed™ 1018 LLDPE blend with 5 wt % COC demonstrated over 25-fold increases in the melt strength of the neat Exceed™ 1018 LLDPE, and 1.5 times of the typical melt strength of an LDPE (which has the highest melt strength among PE due to its long chain branches).

Figure 1:
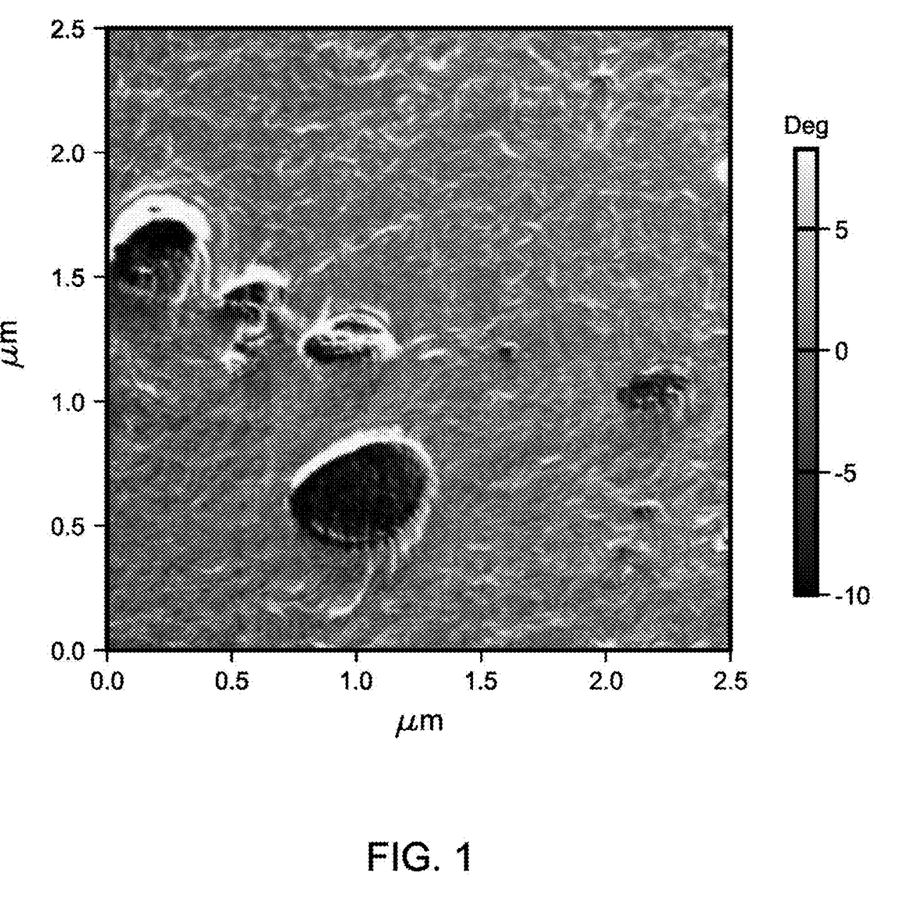
FIG. 1 is an image using Atomic Force Microscopy (AFM) of an inventive composite comprising 10 wt % of the cyclic-olefin copolymer (1) and Exceed™ 1018 LLDPE.
Figure 2:
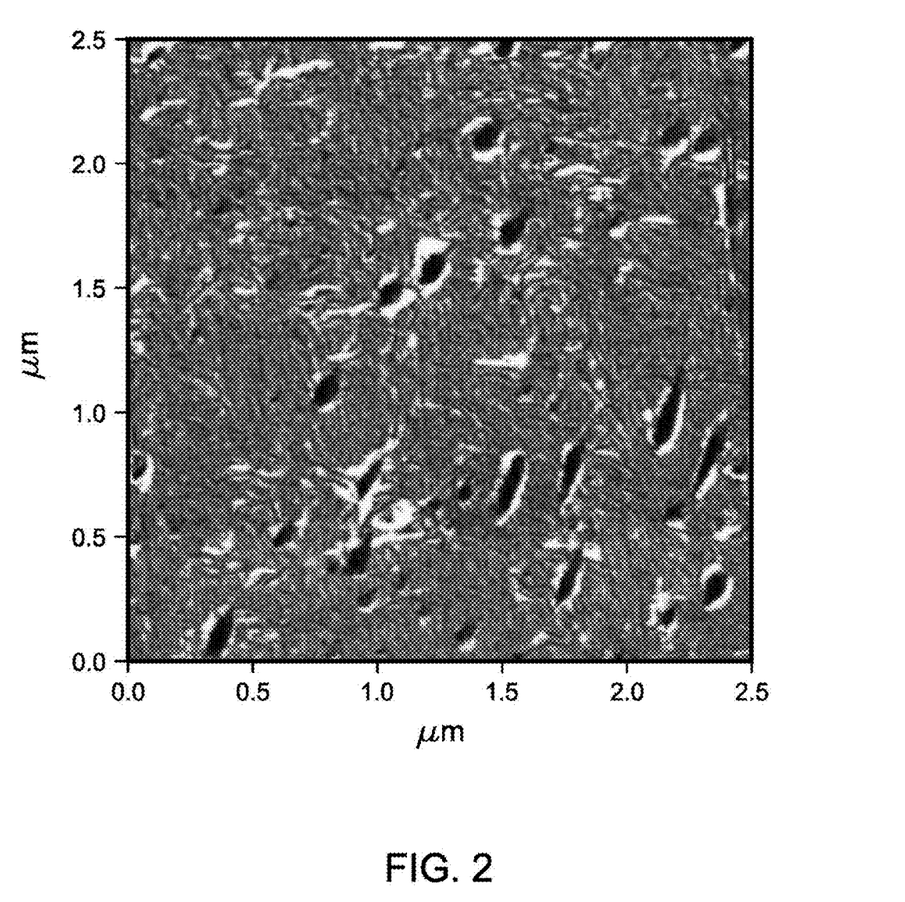
FIG. 2 is an image using AFM of an inventive composite comprising 10 wt % of the cyclic-olefin copolymer (2) and Exceed™ 1018 LLDPE.
Figure 3:
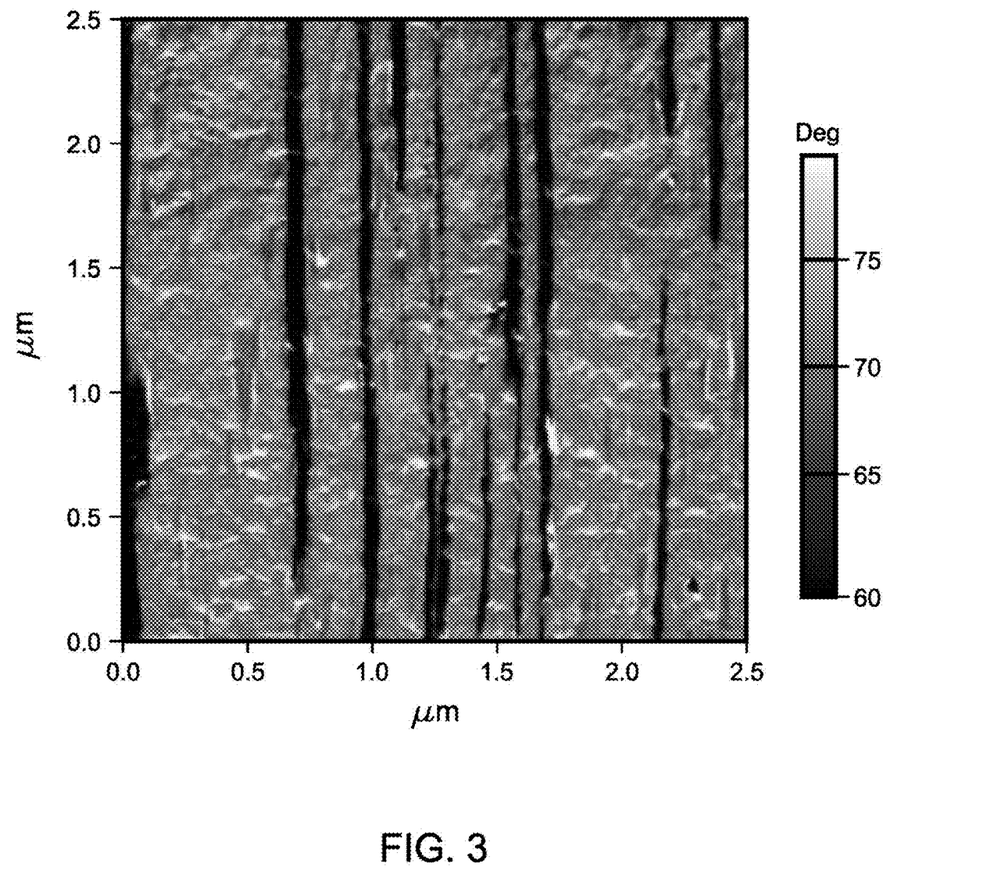
FIG. 3 is an image using AFM of an inventive composite that has been oriented in the direction that the dark structures are running (from top to bottom in the micrograph) comprising 10 wt % of the cyclic-olefin copolymer (1) and Exceed™ 1018 LLDPE.
Figure 4:
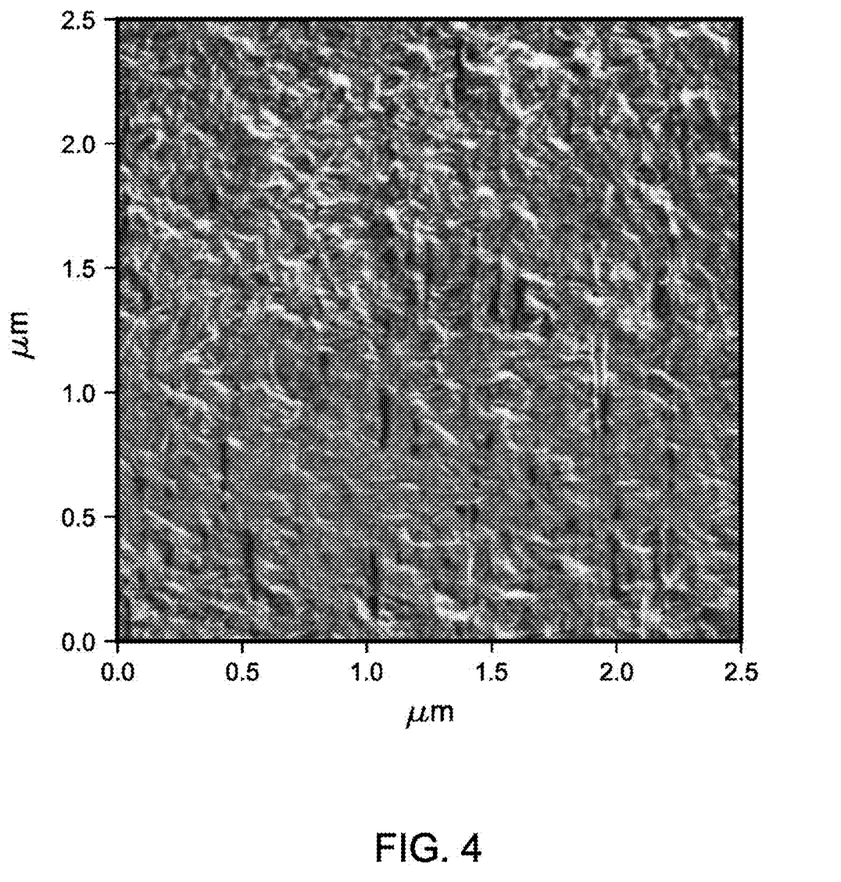
FIG. 4 is an image using AFM of an inventive composite that has been oriented in the direction that the dark structures are running (from top to bottom in the micrograph) comprising 10 wt % of the cyclic-olefin copolymer (2) and Exceed™ 1018 LLDPE.

AFM images were taken of the rheotens strands of the LL3 mixtures with both COC1 and COC2 at the start (no orientation) and at the end (strong orientation). Without orientation, the separated COC domains are spherical (FIG. 1: COC1/LL3 blend, FIG. 2: COC2/LL3 blend), while under MD orientation, they are elongated and form fibers (FIG. 3: COC1/LL3 blend, FIG. 4: COC2/LL3 blend). COC1 can better form long fibers, giving better reinforcement to the polyethylene matrix, which may explain why COC1 in LLDPE blend films showed much better properties.

Melt Index.

ASTM D1238, 2.16 kg, and 190° C.

Differential Scanning Calorimetry.

The degree of crystallinity of a polyolefin is determined by dividing its heat of fusion measured by DSC with the heat of fusion for 100% crystalline polyethylene which has the value of 293 J/g (B. Wunderlich, THERMAL ANALYSIS, 417-431 (Academic Press, 1990)). The DSC procedure may be used to determine the glass transition temperature ($T_g$) of the COC, and was used to determine the heat of fusion ($\Delta H$), melting point temperature ($T_m$) and crystallization temperature ($T_c$) of the composites described herein. In particular, approximately 6 mg of untreated (non-annealed) material was placed in microliter aluminum sample pan. The sample was placed in a differential scanning calorimeter (Perkin Elmer or TA Instrument Thermal Analysis System) and heated from ambient to 210° C. at 10° C./minute and held at 210° C. for 5 minutes. Afterward, the sample is cooled down to −90° C. at 10° C./minute. The sample is held at −90° C. for 5 minutes and then heated from −90° C. to 210° C. at 10° C./minute for a second heating cycle. The $T_g$ and $T_m$ are (or were) determined after the second heating cycle, but the samples are not otherwise annealed. Melting temperature $T_m$, $T_g$ and heat of fusion ($\Delta H$) were determined in the TA Universal Analysis on the second heating cycle. The "Glass Transition" menu item on the TA Universal Analysis equipment is used to calculate the onset, end, inflection, and signal change of $T_g$ in the DSC. The program enables the determination of the onset, which is the intersection of the first and second tangents, where the inflection is the portion of the curve between the first and third tangents with the steepest slope, and the end is the intersection of the second and third tangents.

Sentmanat Extensional Rheology.

Extensional Rheometry was performed on an Anton-Paar MCR 501 or TA Instruments DHR-3 using a SER Universal Testing Platform (Xpansion Instruments, LLC), model SER2-P or SER3-G. The SER (Sentmanat Extensional Rheometer) Testing Platform is described in U.S. Pat. Nos. 6,578,413 and 6,691,569. A general description of transient uniaxial extensional viscosity measurements is provided, for example, in "Strain hardening of various polyolefins in uniaxial elongational flow," 47(3) THE SOCIETY OF RHEOLOGY, INC., J. RHEOL., 619-630 (2003); and "Measuring the transient extensional rheology of polyethylene melts using the SER universal testing platform," 49(3) THE SOCIETY OF RHEOLOGY, INC., J. RHEOL., 585-606 (2005). Strain hardening occurs when a polymer is subjected to uniaxial extension and the transient extensional viscosity increases more than what is predicted from linear viscoelastic theory. Strain hardening is observed as abrupt upswing of the extensional viscosity in the transient extensional viscosity versus time plot. A strain hardening ratio (SHR) is used to characterize the upswing in extensional viscosity and is defined as the ratio of the maximum transient extensional viscosity over three times the value of the transient zero-shear-rate viscosity at the same strain. Strain hardening is present in the material when the ratio is greater than 1. The SER instrument consists of paired master and slave windup drums mounted on bearings housed within a chassis and mechanically coupled via intermeshing gears. Rotation of the drive shaft results in a rotation of the affixed master drum and an equal but opposite rotation of the slave drum which causes the ends of the polymer sample to be sound up onto the drums resulting in the sample stretched. The sample is mounted to the drums via securing clamps in most cases. In addition to the extensional test, samples are also tested using transient steady shear conditions and matched to the extensional data using a correlation factor of three. This provides the linear viscoelastic envelope (LVE). Rectangular sample specimens with dimensions approximately 18.0 mm long× 12.70 mm wide are mounted on the SER fixture. Samples are generally tested at three Hencky strain rates: $0.01\ s^{-1}$, $0.1\ s^{-1}$ and $1\ s^{-1}$. The testing temperature is 150° C. The polymer samples were prepared as follows: the sample specimens were hot pressed at 190° C., mounted to the fixture, and equilibrated at 150° C.

Rheotens.

Melt strength measurements were performed using the Rheotester 1000 capillary rheometer in combination with the Rheotens 71.97 (Göttfert) at a temperature of 190° C. For each material several measurements were performed. The complete amount of material present in the barrel of the Rheotester was extruded through the die and was being picked up by the rolls of the Rheotens. Once the strand was placed between the rolls, the roll speed was adjusted till a zero force was measured. Once the test was started, the speed of the rolls was increased with a certain acceleration rate and the force was measured for each given speed. The "σz" in the Tables below is the "melt strength" and the "ηe" values is the "melt viscosity," and "F" is the "pull-off force."

Density.

The density of the polymers was determined according to ASTM D1505-10. Compression molded samples for density measurements are made according to ASTM D4703-10a. Samples were conditioned by 40 hours conditioning of the density molded specimens (typically made from pellet samples) at 23° C. before density measurement.

Atomic Force Microscopy.

Atomic Force Microscopy (AFM) is a morphological imaging technique carried out using an Asylum Research Cypher Atomic Force Microscope. Samples were cryomicrotomed prior to scanning in order to create a smooth surface at −120° C. After microtoming, the samples were purged under $N_2$ in a desiccator before evaluation. Imaging was conducted according to the following: The instrument was tuned to the fundamental (1st) mode of the cantilever, setting the amplitude at 1.0 V and the drive frequency to about 5% below the free-air resonance frequency of the cantilever. If running in multifrequency mode, a higher mode (2nd, 3rd, or 4th, depending on cantilever and holder) was selected, setting the amplitude to 100 mV and the drive frequency on resonance. The set point was set to 640 mV, the scan rate to 1 Hz, and the scan angle to 90°. An Asylum Research reference standard (10 microns×10 microns pitch grating×200 nm deep pits) was used for the AFM SQC and X, Y, and Z calibration. The instrument was calibrated to be accurate to within 2% or better of true value for X-Y and within 5% or better for Z. Representative scan sizes were 500×500 nm.

Branching Index.

The branching indexes were determined by using a high temperature GPC (Agilent PL-220), equipped with three in-line detectors, a differential refractive index detector ("DRI"), a light scattering ("LS") detector, in conjunction with a viscometer. Detector calibration is described in a paper by T. Sun, P. Brant, R. R. Chance, and W. W. Graessley, in 34(19) MACROMOLECULES, 6812-6820 (2001) and references therein. Three Agilent PLgel 10 μm Mixed-B LS columns were used for the GPC tests herein. The nominal flow rate was 0.5 mL/min, and the nominal injection volume was 300 μL. The various transfer lines, columns, viscometer and differential refractometer (the DRI detector) were contained in an oven maintained at 145° C. Solvent for the experiment was prepared by dissolving 6 grams of butylated hydroxytoluene as an antioxidant in 4 liters of Aldrich reagent grade 1,2,4-trichlorobenzene ("TCB"). The TCB mixture was then filtered through a 0.1 μm polytetrafluoroethylene filter. The TCB was then degassed with an online degasser before entering the GPC. Polymer solutions were prepared by placing dry polymer in a glass container, adding the desired amount of TCB, then heating the mixture at 160° C. with continuous shaking for about 2 hours. All quantities were measured gravimetrically. The TCB densities used to express the polymer concentration in mass/volume units were 1.463 g/ml at 23° C. and 1.284 g/ml at 145° C. The injection concentration was from 0.5 to 2.0 mg/ml, with lower concentrations being used for higher molecular weight samples. Prior to running each sample the DRI detector and the viscometer were purged. The flow rate in the columns was then increased to 0.5 ml/minute, and the DRI was allowed to stabilize for 8 hours before injecting the first sample. The LS laser was turned on at least 1 to 1.5 hours before running the samples. The concentration, c, at each point in the chromatogram was calculated from the baseline-subtracted DRI signal, $I_{DRI}$, using the following equation:

$$c = K_{DRI} I_{DRI} / (dn/dc),$$

where $K_{DRI}$ is a constant determined by calibrating the DRI, and (dn/dc) is the incremental refractive index for the system. The refractive index, n, was 1.500 for TCB at 145° C. and λ was 690 nm. Units of molecular weight are expressed in kg/mole or g/mole, and intrinsic viscosity is expressed in dL/g.

The LS detector was a Wyatt Technology High Temperature Dawn Heleos. The molecular weight, M, at each point in the chromatogram was determined by analyzing the LS output using the Zimm model for static light scattering (W. Burchard & W. Ritchering, "Dynamic Light Scattering from Polymer Solutions," in 80 PROGRESS IN COLLOID & POLYMER SCIENCE, 151-163 (Steinkopff, 1989)) and determined using the following equation:

$$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle θ, "c" is the polymer concentration determined from the DRI analysis, $A_2$ is the second virial coefficient, $P(\theta)$ is the form factor for a mono-disperse random coil, and $K_o$ is the optical constant for the system, as set forth in the following equation:

$$K_o = \frac{4\pi^2 n^2 (dn/dc)^2}{\lambda^4 N_A},$$

where $N_A$ is Avogadro's number, and (dn/dc) is the incremental refractive index for the system, which takes the same value as the one obtained from DRI method, and the value of "n" is as above. Values for Mn are ±50 g/mole, and for Mw are ±100 g/mole.

A high temperature Viscotek Corporation viscometer, which has four capillaries arranged in a Wheatstone bridge configuration with two pressure transducers, was used to determine specific viscosity and branching. One transducer measures the total pressure drop across the detector, and the other, positioned between the two sides of the bridge, measures a differential pressure. The specific viscosity ($\eta_S$) for the solution flowing through the viscometer was calculated from their outputs. The intrinsic viscosity, [$\eta$], at each point in the chromatogram was calculated from the following equation:

$$\eta_S = c[\eta] + 0.3(c[\eta])^2,$$

where "c" is concentration and was determined from the DRI output. The average intrinsic viscosity, $[\eta]_{avg}$, of the sample was calculated using the following equation:

$$[\eta]_{avg} = \frac{\sum c_i [\eta]_i}{\Sigma c_i},$$

where the summations are over the chromatographic slices, i, between the integration limits. For data processing, the Mark-Houwink constants used were K=0.000579 and a=0.695.

The branching index (g'vis or simply g') is defined as the ratio of the intrinsic viscosity of the branched polymer to the intrinsic viscosity of a linear polymer of equal molecular weight and same composition. The branching index g' is defined mathematically as:

$$g' = \frac{[\eta]_{avg}}{kM_v^\alpha}.$$

The intrinsic viscosity of the linear polymer of equal molecular weight and same composition was calculated using the Mark-Houwink equation. For purposes of this invention and claims thereto, $\alpha$=0.695 and k=0.000579 for linear polyethylene homopolymers are used. Linear polyethylene homopolymer was used for g' calculation without considering the comonomer content. The $M_v$ is the viscosity-average molecular weight based on molecular weights determined by LS analysis.

TABLE 1

Materials Used in the Examples

| Material | abbreviation | MI (g/10 min) | Density (g/cm³) | Approx. g'vis | General description |
|---|---|---|---|---|---|
| Topas ™ 5013 | COC1 | ≤0.1 | 1.02 | 1 | Cyclic-olefin copolymer comprising 78 wt % norbornene |
| Topas ™ 9506 | COC2 | 1.0 | 1.01 | 1 | Cyclic-olefin copolymer comprising 62 wt % norbornene |
| Enable ™ 2010 | LL1 | 1.0 | 0.920 | 0.9 | Linear low density polyethylene, some long chain branching, hexene comonomer |
| Enable ™ 2703 | LL2 | 0.3 | 0.927 | 0.9 | Linear low density polyethylene, some long chain branching, hexene comonomer |
| Exceed ™ 1018 | LL3 | 1.0 | 0.918 | 1 | Linear low density polyethylene, no long chain branching, hexene comonomer |
| LD 165BW | LD | 0.33 | 0.922 | 0.6 | Long chain branched, formed by high pressure free-radical polymerization |

TABLE 2

Melt Strength (Rheotens) of COC/LLDPE blend, COC1 = 78 wt % norbornene

| LL2 + COC1 | | LL1 + COC1 | | LL3 + COC1 | |
|---|---|---|---|---|---|
| COC1 wt % | σz (kPa) | COC1 wt % | σz (kPa) | COC1 wt % | σz (kPa) |
| 10 | 4,013 | 10 | 3,898 | 10 | 227 |
| 5 | 3,309 | 5 | 516 | 5 | 979 |
| 3 | 851 | 3 | 523 | 3 | 475 |
| 0 | 601 | 0 | 472 | 0 | 35 |

TABLE 3

Melt Strength (Rheotens) of COC/LLDPE blend, COC2 = 62 wt % norbornene

| LL2 + COC2 | | LL1 + COC2 | | LL3 + COC2 | |
|---|---|---|---|---|---|
| COC2 wt % | σz (kPa) | COC2 wt % | σz (kPa) | COC2 wt % | σz (kPa) |
| 10 | 402 | 10 | 446 | 10 | 349 |
| 5 | 478 | 5 | 588 | 5 | 481 |
| 3 | 503 | 3 | 324 | 3 | 437 |
| 0 | 601 | 0 | 472 | 0 | 36 |

TABLE 4

Characteristics of the COC/LLDPE Blends

| | parameter | units | 90% LL2 10% COC1 | 90% LL2 10% COC2 | 90% LL1 10% COC1 | 90% LL1 10% COC2 |
|---|---|---|---|---|---|---|
| MI | MI (190° C./2.16 kg) | g/10 min | 0.81 | 0.88 | 0.88 | 0.99 |
| | MI (190° C./21.6 kg) | g/10 min | 31.86 | 33.26 | 32.93 | 34.29 |
| DSC | Tm (2nd heat) | ° C. | 114.5 | 114.3 | 113.6 | 113.3 |
| | $\Delta H_f$ | J/g | 103.8 | 90.34 | 108.9 | 113.6 |
| | Tc | ° C. | 103.3 | 103.5 | 104.0 | 103.9 |
| SE | SHR | — | 1.75 | 1.67 | 1.81 | 1.46 |
| Rheotens | Vb | mm/s | 1768.7 | 364.7 | 1759.5 | 395.4 |
| | F | N | 0.134 | 0.066 | 0.125 | 0.064 |
| | λ | −1 | 123.2 | 32.6 | 112.0 | 32.4 |
| | σz | kPa | 4,201 | 424 | 3,898 | 446 |
| | ηe | kPa · s | 60.2 | 40.7 | 57.3 | 39.6 |
| | break/slip | — | slip | break | slip | break |

TABLE 5

Characteristics of the COC/LLDPE Blends

| | parameter | units | 90% LD 10% COC1 | 90% LD COC2 | 90% LL3 COC1 | 90% LL3 COC2 |
|---|---|---|---|---|---|---|
| MI | MI (190° C./2.16 kg) | g/10 min | 0.28 | 0.32 | 0.85 | 0.93 |
| | MI (190° C./21.6 kg) | g/10 min | 29.28 | 29.05 | 14.67 | 15.76 |
| DSC | Tm (2nd heat) | ° C. | 111.3 | 111.1 | 119.5 | 119.2 |
| | $\Delta H_f$ | J/g | 107.8 | 99.76 | 109.9 | 113.4 |
| | Tc | ° C. | 99.7 | 99.7 | 106.6 | 106.7 |
| SER | SHR | — | 6.27 | 7.00 | 1.13 | 1.23 |
| Rheotens | Vb | mm/s | 110.9 | 104.7 | 278.3 | 364.2 |
| | F | N | 0.239 | 0.224 | 0.046 | 0.054 |
| | λ | −1 | 14.8 | 12.7 | 11.7 | 27.2 |
| | σz | kPa | 469 | 414 | 227 | 349 |
| | ηe | kPa · s | 191.5 | 189.9 | 40.5 | 35.4 |
| | break/slip | — | slip | break | Slip | break |

TABLE 6

Characteristics of Comparative polyethylenes

| | parameter | units | LL1 | LL2 | LL3 | LD |
|---|---|---|---|---|---|---|
| MI | MI (190° C./2.16 kg) | g/10 min | 0.94 | 0.82 | 0.92 | 0.29 |
| | MI (190° C./21.6 kg) | g/10 min | 33.7 | 31.4 | 14.5 | 28.7 |
| DSC | Tm (2nd heat) | ° C. | 113.6 | 114.5 | 119.4 | 113.0 |
| | $\Delta H_f$ | J/g | 126.4 | 133.9 | 116.4 | 122.2 |
| | Tc | ° C. | 1042 | 103.3 | 106.6 | 98.7 |
| SER | SHR | — | 1.75 | 1.68 | 1.27 | 6.01 |
| Rheotens | Vb | mm/s | 378.6 | 240.3 | 541.1 | 113.4 |
| | F | N | 0.071 | 0.085 | 0.037 | 0.303 |
| | λ | −1 | 26.3 | 20.3 | 18.3 | 16.4 |
| | σz | kPa | 472 | 360 | 36 | 608 |
| | ηe | kPa · s | 46.6 | 60.7 | 27.8 | 234.2 |
| | break/slip | — | break | break | slip | break |

As used herein, "consisting essentially of" means that the claimed article or composite includes only the named components and no additional components that will alter its measured properties by any more than 20, or 15, or 10%, and most preferably means that "additives" are present to a level of less than 5, or 4, or 3, or 2 wt % by weight of the composition. Such additional additives can include, for example, fillers, nucleators or clarifiers, colorants, foaming agents, antioxidants, alkyl-radical scavengers (preferably vitamin E, or other tocopherols and/or tocotrienols), anti-UV agents, acid scavengers, curatives and cross-linking agents, aliphatic and/or cyclic containing oligomers or polymers (often referred to as hydrocarbon resins), and other additives well known in the art. As it relates to a process, the phrase "consisting essentially of" means that there are no other process features that will alter the claimed properties of the polymer, polymer blend or article produced therefrom by any more than 10, 15 or 20%, but there may otherwise be process features not named.

For all jurisdictions in which the doctrine of "incorporation by reference" applies, all of the test methods, patent publications, patents and reference articles are hereby incorporated by reference either in their entirety or for the relevant portion for which they are referenced.

The invention claimed is:

1. A composite comprising:
   from 75 wt % to 99 wt % of a polyethylene based on the weight of the composite, wherein the polyethylene has a density less than 0.93 g/cm$^3$; and from 1 wt % to 25 wt % of at least one cyclic-olefin copolymer based on the weight of the composite, wherein the cyclic-olefin copolymer has a glass transition temperature (Tg) of at least 30° C and a melt index (190° C./2.16kg) of from 0.05 g/10 min to 4 g/10 min.

2. The composite of claim 1, where the cyclic-olefin copolymer comprises at least 50 wt % of cyclic olefin derived units based on the weight of the cyclic-olefin copolymer.

3. The composite of claim 1, wherein the glass transition temperature of the cyclic-olefin copolymer is 30° C. to 180° C.

4. A composite comprising:
from 75 wt% to 99 wt% of a polyethylene based on the weight of the composite, wherein the polyethylene has a density less than 0.93 g/cm$^3$ and a branching index (g'vis) of less than 0.8; and
from 1 wt% to 25 wt% of at least one cyclic-olefin copolymer based on the weight of the composite, wherein the cyclic-olefin copolymer has a glass transition temperature (Tg) of at least 30° C. wherein, the composite has a melt strength of from 300 kPa to 600 kPa.

5. The composite comprising:
from 75 wt % to 99 wt% of a polyethylene, based on the weight of the composite, wherein the polyethylene has a density less than 0.93 g/cm$^3$ and a branching index (g'$_{vis}$) of greater than 0.95; and
from 1 wt % to wt % of at least one cyclic-olefin copolymer, based on the weight of the composite, wherein the cyclic-olefin copolymer has a glass transition temperature (Tg) of at least 30° C. wherein the composite has a melt strength of from 100 kPa to 1000 kPa.

6. A composite comprising:
from 75 wt% to φwt% of a polyethylene based on the weight of the composite, wherein the polyethylene has a density less than 0.93 g/cm$^3$ and a branching index (g'$_{vis}$) of from 0.95 to 0.8; and
from 1 wt % to 25 wt % of at least one cyclic-olefin copolymer based on the weight of the composite, wherein the cyclic-olefin copolymer has a glass transition temperature (Tg) of at least 30° C. wherein the composite has a melt strength of greater than 800 kPa.

7. The composite of claim 1, wherein the polyethylene has a density of from 0.90 g/cm$^3$ to 0.93 g/cm$^3$.

8. A composite comprising:
from 75 wt % to 99 wt % of a polyethylene based on the weight of the composite, wherein the polyethylene has a density less than 0.93 g/cm$^3$; and
from 1 wt % to 25 wt% of at least one cyclic-olefin copolymer based on the weight of the composite, wherein the cyclic-olefin copolymer has a glass transition temperature (Tg) of at least 30° C., and the composite has a crystallization temperature (Tc) of at least 100° C.

9. A composite comprising:
from 75 wt% to 99 wt% of a polyethylene based on the weight of the composite, wherein the polyethylene as a density less than 0.93 g/cm$^3$; and
from 1 wt % to 25 wt % of at least one cyclic-olefin copolymer based on the weight of the composite, wherein the cyclic-olefin copolymer has a glass transition temperature (Tg) of at least 30° C., wherein the composite has a heat of fusion (ΔH) of less than 120 J/g.

10. The composite of claim 1, wherein inorganic fillers and/or fibers are absent.

11. The composite of claim 1, wherein polymeric compatibilizers are absent.

12. A composite polyethylene and within a range from 1 wt % to 25 wt % of at least one cyclic-olefin copolymer, based upon the weight of the composite, wherein the cyclic-olefin copolymer has a glass transition temperature (Tg) of at least 30° C., wherein the composite comprises rods having an average length of at least 4 μm, and at least 5 nm in average diameter.

13. An oriented article comprising the composite of claim 1.

14. A method for forming a composition comprising the composite of claim 1, said method comprising, combining from 75 wt % to 99 wt % of a polyethylene, based on the weight of the composite, wherein the polyethylene has a density less than 0.93 g/cm$^3$; and from 1 wt % to 25 wt % of at least one cyclic-olefin copolymer, based on the weight of the composite, wherein the cyclic-olefin copolymer has a glass transition temperature (Tg) of at least 30° C. and orienting the composite.

15. The method of claim 14, wherein the orienting step comprises melt blending, film forming, thermoforming, rotomolding, blow molding, injection molding, extrusion coating, foaming, or a combination thereof.

16. A composite comprising: from 75 wt % to 99 wt % of a polyethylene based on the weight of the composite, wherein the polyethylene has a density less than 0.93 g/cm$^3$; and from 1 wt % to 25 wt % of at least one cyclic-olefin copolymer, based on the weight of the composite, wherein the cyclic-olefin copolymer has a glass transition temperature (Tg) of at least 30° C., and wherein the composite comprises rods having an average length of at least 4 μm and an average diameter of at least 5 nm.

17. The composite of claim 12, wherein the composite comprises from 75 wt % to 99 wt % of the polyethylene, based on a weight of the composite, and wherein the polyethylene has a density of less than 0.93 g/cm$^3$.

18. The composite of claim 12, wherein the rods comprise a plurality of dangling cyclic-olefin copolymer chains diffused inside an amorphous domains of the polyethylene.

19. A composite comprising:
from 75 wt% to 99 wt% of a polyethylene based on the weight of the composite, wherein the polyethylene has a density less than 0.93 g/cm$^3$; and
from 1 wt % to 25 wt % of at least one cyclic-olefin copolymer based on the weight of the composite, wherein the cyclic-olefin copolymer has a glass transition temperature (Tg) of at least 30° C., wherein at least a portion of the cyclic-olefin copolymer is in the form of a rod.

20. The composite of claim 16, wherein the composite comprises from 75 wt % to 99 wt % of the polyethylene, based on a weight of the composite, and wherein the polyethylene has a density of less than 0.93 g/cm$^3$.

21. The composite of claim 16, wherein the rods comprise a plurality of dangling cyclic-olefin copolymer chains diffused inside an amorphous domains of the polyethylene.

22. The composite of claim 12, where the cyclic-olefin copolymer comprises at least 50 wt % of cyclic olefin derived units, based on the weight of the cyclic-olefin copolymer.

23. The composite of claim 12, wherein the polyethylene has a branching index (g'$_{vis}$) of less than 0.8, and the composite has a melt strength of from 300 kPa to 600 kPa.

24. The composite of claim 12, wherein the polyethylene has a branching index ($g'_{vis}$) of greater than 0.95, and the composite has a melt strength of from 100 kPa to 1,000 kPa.

25. The composite of claim 6, wherein the polyethylene has a density of from 0.90 to 0.93 g/cm³.

26. The composite of claim 12, wherein the polyethylene has a density of from 0.90 g/cm³ to 0.93 g/cm³.

27. The composite of claim 12, wherein the composite has a crystallization temperature (Tc) of at least 100° C.

28. The composite of claim 12, wherein the composite has a heat of fusion (ΔH) of less than 120 J/g.

29. The composite of claim 12, wherein inorganic fillers and/or fibers are absent.

30. The composite of claim 12, wherein polymeric compatibilizers are absent.

31. An oriented article comprising the composite of claim 12.

* * * * *